United States Patent
Lee

(10) Patent No.: US 9,951,687 B2
(45) Date of Patent: Apr. 24, 2018

(54) GAS TURBINE WITH PLURALITY OF TIE RODS AND METHOD OF ASSEMBLING THE SAME

(71) Applicant: Doosan Heavy Industries Construction Co., Ltd., Gyeongsangnam-do (KR)

(72) Inventor: Sang Eon Lee, Daejeon (KR)

(73) Assignee: Doosan Heavy Industries Construction Co., Ltd., Gyeongsangnam-do (KR)

( * ) Notice: Subject to any disclaimer, the term of this patent is extended or adjusted under 35 U.S.C. 154(b) by 296 days.

(21) Appl. No.: 14/798,614

(22) Filed: Jul. 14, 2015

(65) Prior Publication Data

US 2016/0146101 A1    May 26, 2016

(30) Foreign Application Priority Data

Nov. 21, 2014    (KR) .................. 10-2014-0163625

(51) Int. Cl.
*F02C 3/04*          (2006.01)
*F01D 5/06*          (2006.01)
*F16C 3/02*          (2006.01)

(52) U.S. Cl.
CPC .............. *F02C 3/04* (2013.01); *F01D 5/066* (2013.01); *F16C 3/02* (2013.01); *F05D 2230/644* (2013.01); *F16C 2360/23* (2013.01)

(58) Field of Classification Search
CPC . F01D 5/025; F01D 5/026; F01D 5/06; F01D 5/066; F05D 2230/60;

(Continued)

(56) References Cited

U.S. PATENT DOCUMENTS 2,306,960 A * 12/1942 Kinnucan ................. F16C 3/02
                                                                                                464/183
2004/0007830 A1* 1/2004 Uematsu ................. F01D 5/066
                                                                                                277/628

(Continued)

FOREIGN PATENT DOCUMENTS

CN          102116201          7/2011
CN          102116201 A *    7/2011

(Continued)

OTHER PUBLICATIONS

Extended European Search Report for Application No. 15175224.3 dated Apr. 13, 2016.

(Continued)

*Primary Examiner* — Woody Lee, Jr.
*Assistant Examiner* — Elton Wong
(74) *Attorney, Agent, or Firm* — Harness, Dickey & Pierce, P.L.C.

(57) ABSTRACT

Disclosed herein is a gas turbine with a plurality of tie rods. The gas turbine includes a compressor section having a plurality of compressor-side rotor disks, a turbine section having a plurality of turbine-side rotor disks arranged downstream of the compressor-side rotor disks, a first tie rod penetrating central portions of the rotor disks provided in the compressor section to press the compressor-side rotor disks against each other, a plurality of second tie rods penetrating vicinities of edges of the rotor disks provided in the turbine section to press the turbine-side rotor disks against each other, and a torque transfer member coupled to the first and second tie rods so as to transfer rotational torque generated by the turbine section to the compressor section.

19 Claims, 7 Drawing Sheets

(58) Field of Classification Search
CPC .. F05D 2230/633; F05D 2230/70; F02C 3/04; F02C 3/045; F16C 3/02
See application file for complete search history.

(56) References Cited

U.S. PATENT DOCUMENTS

| | | | |
|---|---|---|---|
| 2010/0054943 A1* | 3/2010 | Ichiryu | F04D 27/0292 416/198 A |
| 2011/0268579 A1* | 11/2011 | Light | F04D 29/054 416/244 A |

FOREIGN PATENT DOCUMENTS

| | | |
|---|---|---|
| GB | 723883 A | 2/1955 |
| GB | 2452932 A | 3/2009 |
| JP | 61-86501 U | 6/1986 |
| JP | H04321724 A | 11/1992 |
| JP | H051567 A | 1/1993 |
| JP | 2003120209 A | 4/2003 |
| JP | 2008128292 A | 6/2008 |
| JP | 2009103087 A | 5/2009 |

OTHER PUBLICATIONS

Japanese Office Action for Application No. 2015-130093 dated Apr. 26, 2016.

* cited by examiner

GAS TURBINE WITH PLURALITY OF TIE RODS AND METHOD OF ASSEMBLING THE SAME

CROSS-REFERENCE TO RELATED APPLICATIONS

This application is a 371 U.S. National Stage of International Application No. PCT/KR2014/0163625, filed on Nov. 21, 2014. The entire disclosures of the above application is herein incorporated by reference.

BACKGROUND OF THE INVENTION

Field of the Invention

Exemplary embodiments of the present invention relate to a gas turbine with a plurality of tie rods and a method of assembling the same, and more particularly, to a gas turbine having a plurality of tie rods for mutually fastening compressor-side and turbine-side rotor disks provided in the gas turbine, and a method of assembling the same.

Description of the Related Art

A gas turbine is a type of motor which jets combustion gas toward blades of a turbine to obtain torque, and may be largely configured of a compressor, a combustor, and a turbine. The compressor serves to compress introduced air to a high pressure by receiving a portion of power generated by rotation of the turbine, and the compressed air is transferred to the combustor.

The combustor mixes and burns compressed air and fuel to generate a flow of high-temperature combustion gas, and then jets the combustion gas to the turbine, so that the turbine is rotated by the jetted combustion gas so as to obtain torque.

Here, each of the compressor and the turbine includes a plurality of rotor disks, each of which has blades radially coupled to an outer peripheral portion thereof. The compressor typically includes the more number of rotor disks than that of the turbine. Hereinafter, the plurality of rotor disks arranged to the compressor is referred to as "a compressor section" and the plurality of rotor disks arranged to the turbine is referred to as "a turbine section".

Each of the rotor disks is fastened to an adjacent rotor disk so as to rotate together. In addition, the individual rotor disks are fixed in a state of being pressed against each other using a tie rod so as not to be axially moved.

The tie rod is inserted to penetrate centers of the respective rotor disks, and the rotor disks may be fastened to each other through pressure nuts coupled to both ends of the tie rod so as not to be axially moved.

Meanwhile, since the combustor is arranged between the compressor section and the turbine section, the compressor section and the turbine section are spaced apart from each other such that a space for arrangement of the combustor is defined therebetween. The tie rod restricts only the axial movement of the rotor disks, and thus the rotor disks may freely rotate about the tie rod. Accordingly, the gas turbine additionally includes a torque transfer member which may transfer rotational torque generated by the turbine section to the compressor section via the combustor.

Since the tie rod eventually has a length enough to penetrate all of the compressor section, the torque transfer member, and the turbine section, vibration and noise may be generated during the operation of the gas turbine and deflection of the tie rod may be generated when the tie rod is used for a long time.

SUMMARY OF THE INVENTION

An object of the present invention is to provide a gas turbine with tie rods, which enables generation of vibration and noise to be minimized.

Another object of the present invention is to provide a gas turbine with tie rods, capable of having improved durability compared to the related art.

Another object of the present invention is to provide a gas turbine with tie rods, which enables maintenance thereof to be more easily performed.

A further object of the present invention is to provide a method of assembling the above gas turbine.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, a gas turbine includes a compressor section having a plurality of compressor-side rotor disks, a turbine section having a plurality of turbine-side rotor disks arranged downstream of the compressor-side rotor disks, a first tie rod penetrating central portions of the rotor disks provided in the compressor section to press the compressor-side rotor disks against each other, a plurality of second tie rods penetrating vicinities of edges of the rotor disks provided in the turbine section to press the turbine-side rotor disks against each other, and a torque transfer member coupled to the first and second tie rods so as to transfer rotational torque generated by the turbine section to the compressor section.

The torque transfer member may include a first end facing the compressor section, and the first end may have a first through-hole through which the first tie rod passes.

The gas turbine may further include a first pressure nut fastened to one side of the first tie rod, and the first pressure nut may press an inside surface of the first end toward the compressor section.

At least a portion of the first pressure nut may be inserted into the first through-hole.

The torque transfer member may include a second end facing the turbine section, and the second end may have a plurality of second through-holes arranged radially such that the second tie rods pass through the second through-holes.

The gas turbine may further include a second pressure nut fastened to one side of each of the second tie rods, and the second pressure nut may press an inside surface of the second end toward the turbine section.

The second end may have a service hole communicating with the inside of the torque transfer member, and access to the first and second pressure nuts may be realized through the service hole.

The service hole may have a diameter increased toward the first end.

The first end may have a larger outer diameter than that of the second end.

The torque transfer member may have a reinforcement portion formed between the first and second ends to protrude toward a center of the torque transfer member.

The reinforcement portion may have a larger inner diameter than an outer diameter of the first pressure nut.

The torque transfer member may have an inner diameter increased toward the reinforcement portion from the first and second ends.

In accordance with another aspect of the present invention, a gas turbine includes a compressor section having a plurality of compressor-side rotor disks, a turbine section having a plurality of turbine-side rotor disks arranged downstream of the compressor-side rotor disks, a first tie rod penetrating central portions of the rotor disks provided in the compressor section to press the compressor-side rotor disks against each other, a plurality of second tie rods penetrating vicinities of edges of the rotor disks provided in the turbine section to press the turbine-side rotor disks against each other, and a torque tube including a first end facing the compressor section and a second end facing the turbine section, the torque tube being coupled to the first and second tie rods.

A first pressure nut fastened to the first tie rod may be arranged to the first end, and second pressure nuts fastened to the second tie rods may be arranged to the second end.

The second pressure nuts may be radially arranged on the second end, and the second end may have service holes which are formed radially and inwardly of the second pressure nuts and communicate with the inside of the torque tube.

Each of the service holes may have a diameter increased toward the first end.

The torque transfer member may have a reinforcement portion formed between the first and second ends to protrude toward a center of the torque transfer member. The reinforcement portion may have a larger inner diameter than an outer diameter of the first pressure nut.

The torque transfer member may have an inner diameter increased toward the reinforcement portion from the first and second ends.

In accordance with a further aspect of the present invention, a method of assembling a gas turbine includes inserting a plurality of first rotor disks to one first tie rod in a longitudinal direction thereof, inserting a torque tube from one side end of the first tie rod, fixing one end of the first tie rod to the torque tube in a state in which the first rotor disks are not rotated relative to the torque tube, fixing a plurality of second tie rods to a portion of the torque tube, inserting a plurality of second rotor disks to the plurality of second tie rods in a longitudinal direction thereof, and fixing one ends of the plurality of second tie rods to one of the rotor disks in a state in which the second rotor disks are not rotated relative to the torque tube.

The first tie rod may be inserted to penetrate central portions of the first rotor disks.

The second tie rods may be spaced radially and outwardly from centers of the second rotor disks to penetrate the second rotor disks.

The first rotor disks may be arranged in a compressor section.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

Figure 1:
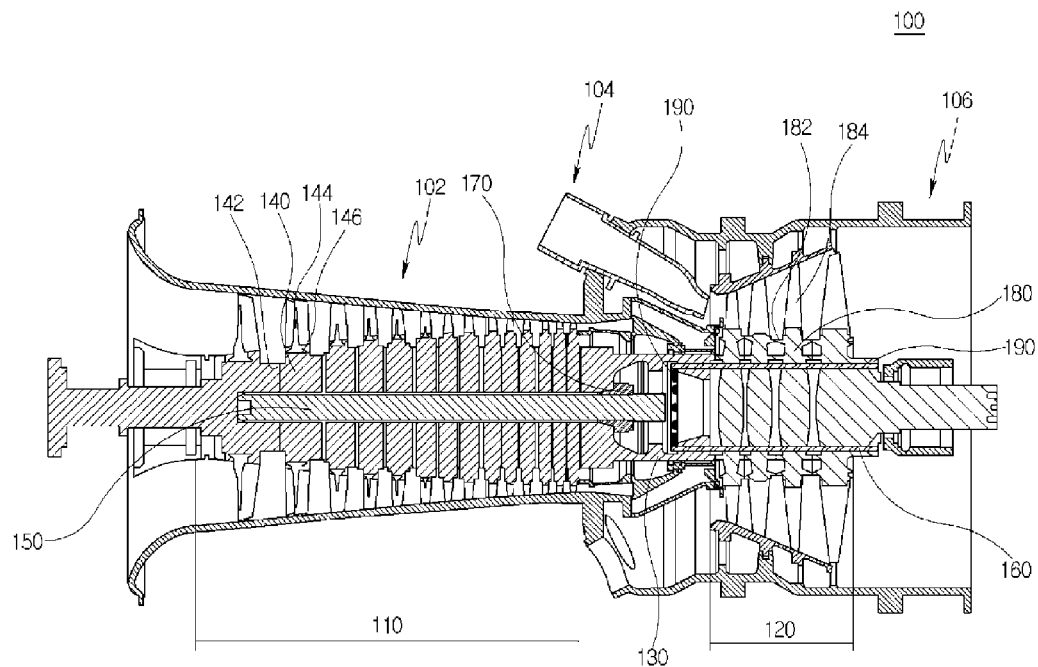
FIG. 1 is a perspective view illustrating a gas turbine according to an embodiment of the present invention.

A gas turbine according to exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

FIG. 1 shows a gas turbine 100 according to an embodiment of the present invention. The gas turbine 100 includes a body 102 and a diffuser 106 arranged behind the body 102 such that combustion gas passing through a turbine is discharged through the diffuser 106. A combustor 104, which is supplied with compressed air and burns the compressed air, is arranged in front of the diffuser 106.

The following description will be given in accordance with a flow direction of air. A compressor section 110 is located upstream of the body 102 and a turbine section 120 is located downstream thereof. A torque tube 130 as a torque transfer member which transfers rotational torque generated by the turbine section to the compressor section is arranged between the compressor section 110 and the turbine section 120. The compressor section 110 has a total of 14 compressor rotor disks 140, and the individual compressor rotor disks 140 are fastened to each other by one center tie rod 150 so as not to be axially spaced apart from each other.

Specifically, the compressor rotor disks 140 are axially aligned in a state in which the center tie rod penetrates substantially centers of the respective compressor rotor disks 140. In addition, each of the compressor rotor disks 140 includes a flange 142 formed to axially protrude in the vicinity of an outer peripheral portion thereof, and the flange 142 has a plurality of protrusion portions and is coupled to an adjacent rotor disk such that the compressor rotor disk 140 is not rotated relative to the adjacent rotor disk.

The compressor rotor disk 140 has a plurality of blades 144 radially coupled on an outer peripheral surface thereof. Each of the blades 144 has a dovetail portion 146 and is coupled to the compressor rotor disk 140 using the dovetail portion 146. The coupling method between the blade and the compressor rotor disk 140 is not necessarily limited to using the dovetail portion.

The center tie rod 150 is arranged to penetrate the centers of the plurality of compressor rotor disks 140. One side end of the center tie rod 150 is fastened into the uppermost compressor rotor disk 140 and the other side end thereof is inserted and fixed into the torque tube 130. Specifically, the other side end of the center tie rod 150 is fastened and fixed to a first pressure nut 170 in the torque tube. The first pressure nut 170 presses the torque tube toward the compressor rotor disks 140, thereby allowing the individual compressor rotor disk 140 to be maintained in a state of being pressed against each other.

Meanwhile, the turbine section 120 has 4 turbine rotor disks 180. Each of the turbine rotor disks 180 has a form similar to the compressor rotor disk. Thus, the turbine rotor disk 180 also includes a flange 182 having coupling protrusions for coupling with an adjacent turbine rotor disk, and a plurality of radial turbine blades 184. The turbine blades 184 may also be coupled to each of the turbine rotor disks 180 in a dovetail manner.

However, the turbine rotor disks 180 differ from the compressor rotor disks 140 in that the turbine rotor disks 180 are fastened to each other by a plurality of tie rods 160 (12 tie rods in the embodiment) radially arranged in a circumferential direction, instead of one center tie rod. The tie rods 160 are arranged to be inserted in through holes 161 that are located at positions which are radially outwardly spaced from centers of the turbine rotor disks 180. Two second pressure nuts 190 are fastened to both ends of each tie rod 160 so that the turbine rotor disks 180 are pressed against and coupled to each other.

Here, one second pressure nut 190 located at a downstream end of the tie rod is arranged to be exposed to a surface of the last turbine rotor disk, whereas the other second pressure nut 190 located at an upstream end thereof is arranged inside the torque tube 130. Here, each of the tie rods 160 has a smaller diameter than the center tie rod 150.

Figure 2:
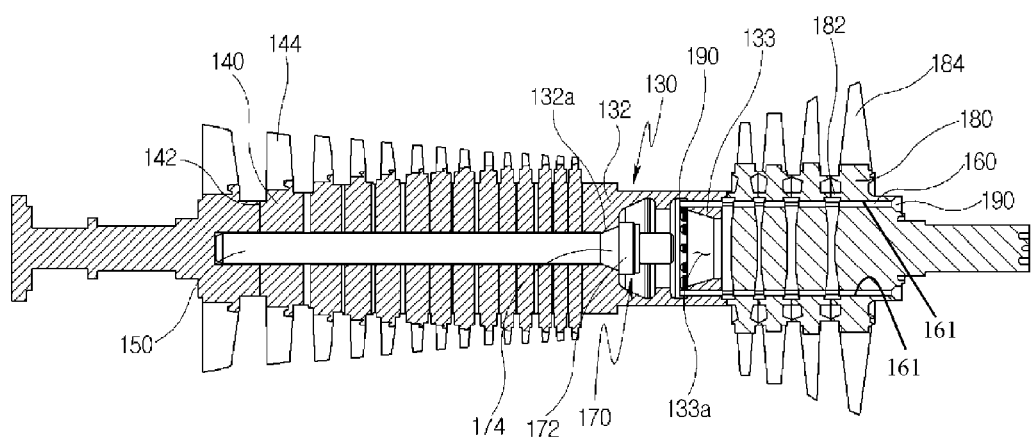
FIG. 2 is a cross-sectional view illustrating an inner structure of the gas turbine illustrated in FIG. 1.

Referring to FIG. 2, the first pressure nut 170 has a flange portion 172 formed on an outer peripheral surface to radially protrude, and a conical nose portion 174 is formed in front of the flange portion 172. The first pressure nut 170 is arranged on an inside surface of a first end 132 of the torque tube 130. Specifically, the first end 132 has a first through-hole 132a formed on a substantially central portion thereof such that the center tie rod 150 is penetrated and inserted into the first through-hole 132a, and the first pressure nut 170 is fastened to the center tie rod 150 in a state in which the nose portion 174 is inserted into the first through-hole 132a. Here, the first through-hole 132a has a tapered inner portion configured to correspond to the nose portion 174, and thus the first pressure nut 170 may be inserted into the first through-hole 132a.

The flange portion 172 serves to press the inside surface of the first end 132 toward the compressor section. Particularly, since the center tie rod 150 supports the 14 compressor rotor disks by one tie rod, stress is significantly applied to the first pressure nut. As a result, since stress corresponding to the above stress is also applied to the first end, the first end is formed to have a larger diameter and thickness compared to other portions of the torque tube.

On the other hand, a second end 133 of the torque tube 130 facing the turbine section is formed to have a relatively small thickness. A service hole 133a is formed radially and inwardly of the circumference of the second end 133 formed by the plurality of tie rods 160. The service hole 133a is formed such that a user is accessible to the first pressure nut 170 in a removal state of the turbine rotor disks. As a result, the user may couple or decouple the first pressure nut through the service hole 133a, and may withdraw the first pressure nut 170 through the service hole 133a since the service hole 133a has a larger inner diameter than the outer diameter of the first pressure nut 170.

Meanwhile, a reinforcement portion 134 is formed between the first and second ends 132 and 133. The reinforcement portion 134 is formed inside the torque tube 130 to protrude in a ring shape, and the torque tube 130 has a reduced thickness toward the reinforcement portion 134 from both ends thereof. That is, the wall thickness of the torque tube has a maximum wall thickness in the vicinity of each end thereof and has a minimum wall thickness in the vicinity adjacent to the reinforcement portion 134.

The reinforcement portion 134 is formed to minimize deformation of the torque tube when the gas turbine is operated. The reinforcement portion 134 keeps a balance between deflection caused by a load applied to the torque tube and a weight thereof and centrifugal force applied to the torque tube, thereby allowing the outer peripheral surface of the torque tube to be maintained in a straight state without deflection during the operation of the gas turbine.

That is, the torque tube has a hollow shape such that rotational inertia of the torque tube is minimized and the first and second pressure nuts are inserted and fastened within the torque tube. As a result, the torque tube has a relatively low strength compared to a solid shaft and has a high possibility of deformation when external force is applied to the torque tube. For example, torsional torque generated by the turbine section is applied to the torque tube and centrifugal force also acts when the torque tube rotates at a high speed. In addition, the torque tube is affected by a self-weight.

The reinforcement portion 134 protrudes radially and inwardly from an inner wall of the torque tube and extends circumferentially from an inner surface of the torque tube. As a result, a relatively large force is radially and outwardly applied to the reinforcement portion 134 by the centrifugal force generated when the torque tube rotates, compared to a portion adjacent to the reinforcement portion 134. Consequently, the deflection caused by the weight of the torque tube is offset by the centrifugal force to thereby minimize the deformation of the torque tube.

In addition, torsion of the torque tube caused due to transfer of rotational torque is minimized by the relatively large thickness of the reinforcement portion 134.

Here, the torque tube is not necessarily limited to having a shape shown in the drawings, and the torque tube may have any shape. For example, the reinforcement portion 134 may also be formed to protrude radially outwardly from the outer peripheral surface of the torque tube, unlike that shown in FIG. 3.

Figure 3:
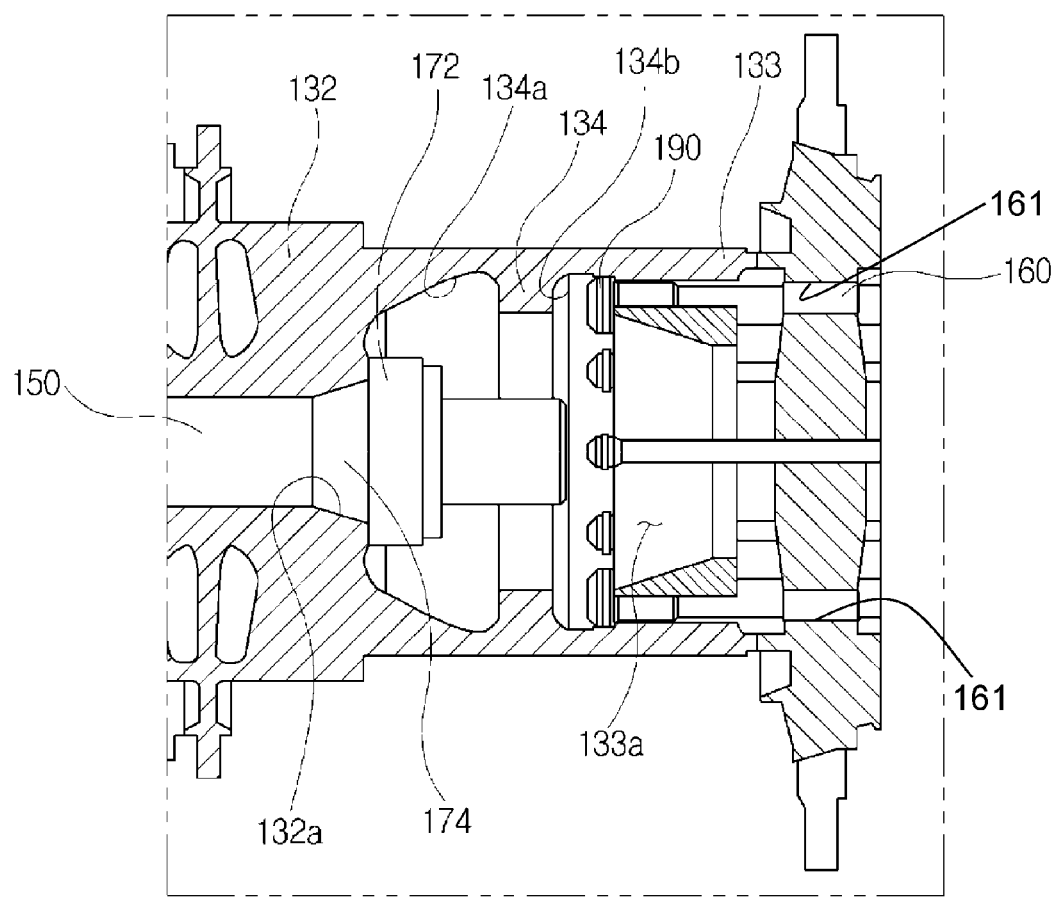
FIG. 3 is an enlarged cross-sectional view illustrating a torque tube in FIG. 2.
Figure 4:
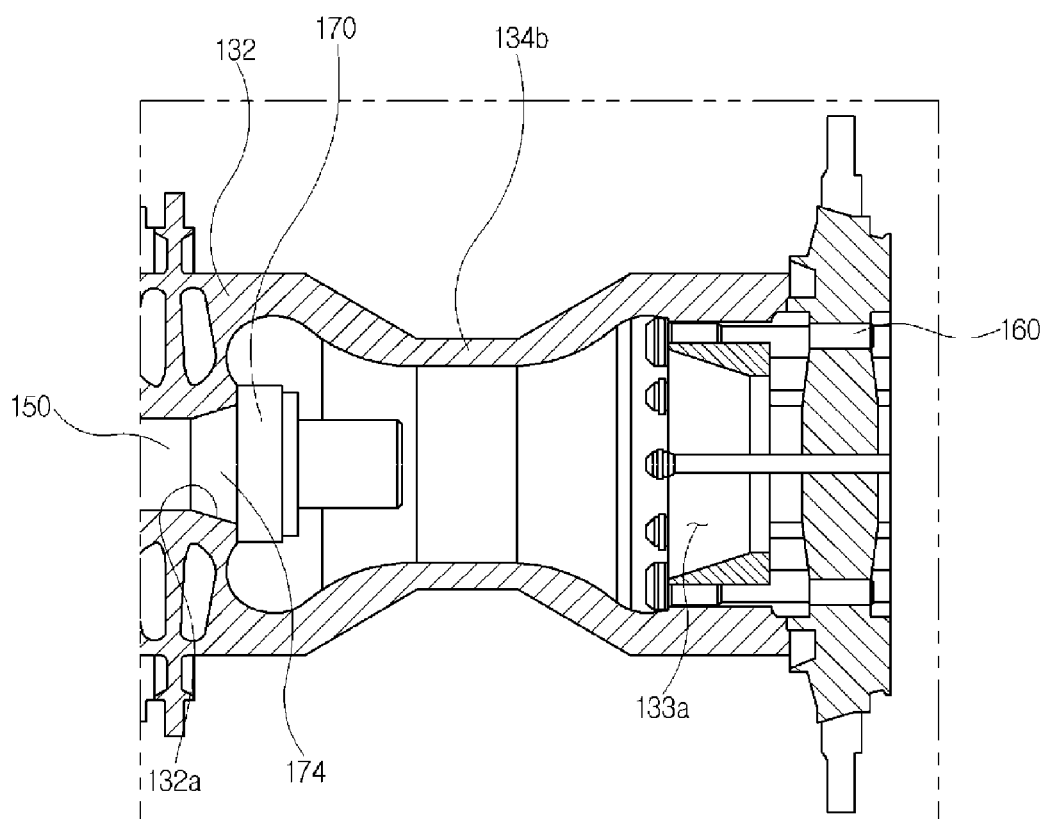
FIG. 4 is a cross-sectional view illustrating a modification example of the torque tube of the gas turbine illustrated in FIG. 1.

FIG. 4 is a cross-sectional view illustrating a modification example of the torque tube. Referring to FIG. 4, the torque tube does not have the reinforcement portion protruding radially inwardly as shown in FIG. 3 in the modification example. Alternatively, a torque tube shown in FIG. 4 has an outer diameter configured to be narrowed toward the central portion thereof from both ends 132 and 133 and be uniform at a reinforcement portion 134b. That is, in the torque tube shown in FIG. 4, the reinforcement portion has a smaller outer diameter than that shown in FIG. 3.

In addition, the thickness of the torque tube is substantially uniformly maintained across the reinforcement portion. Here, the reinforcement portion has a larger inner diameter than the outer diameter of the first pressure nut such that the first pressure nut passes through the reinforcement portion.

The torque tube shown in FIG. 4 is useful to improve initial starting of the gas turbine. In general, the gas turbine requires an external power source such as a starter motor during initial starting, and may be continuously operated without the aid of the starter motor only when a shaft of the gas turbine reaches a predetermined operating speed by the starter motor. In this case, a time delay is generated until the gas turbine reaches a normal operating speed from the beginning of the starting. Therefore, it is necessary to minimize the time delay for improvement in starting since the gas turbine is operable within a rapider time as the time delay is decreased.

In the example shown in FIG. 4, since the reinforcement portion has a small outer diameter compared to other portions of the torque tube, the reinforcement portion has a small rotational inertia moment compared to a case in which the reinforcement portion has the same outer diameter as those of the other portions. Since the rotational inertia moment functions as resistance against rotation during initial starting of the gas turbine, the gas turbine may reach a normal operating speed within a rapider time by the small rotational inertia moment of the reinforcement portion shown in FIG. 4.

Figure 5:
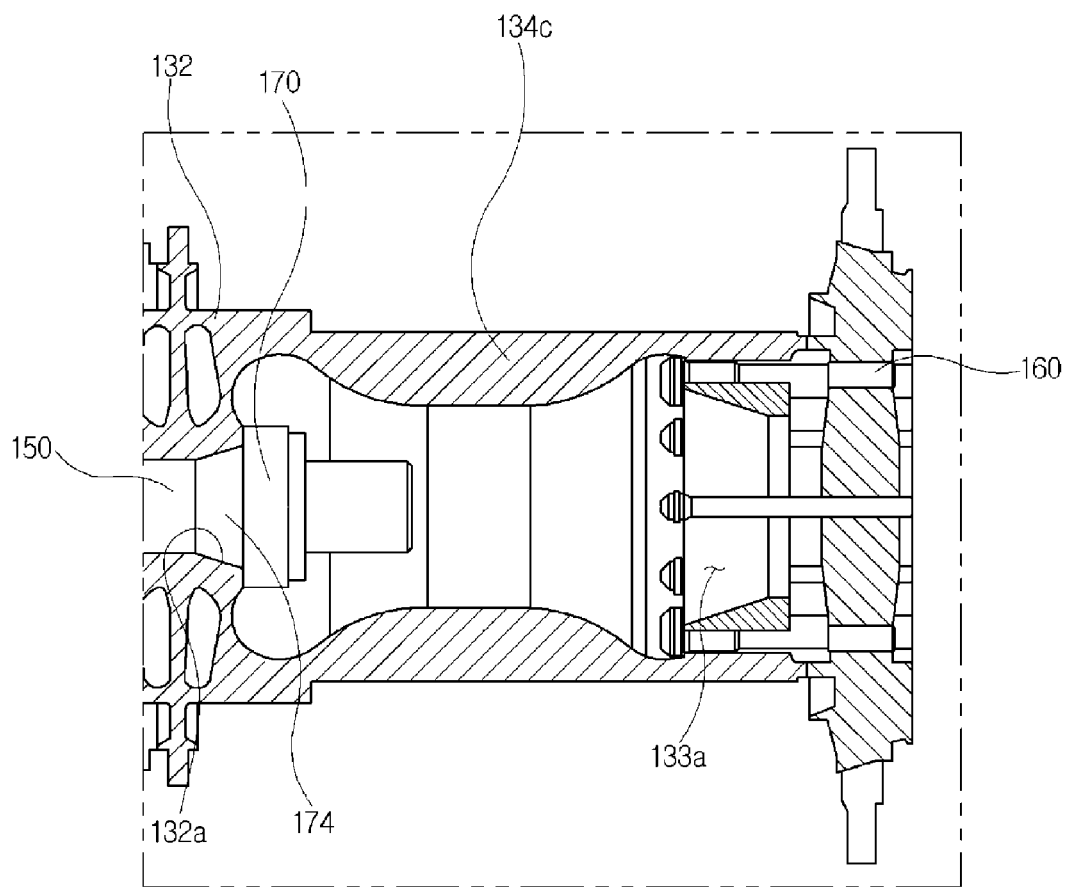
FIG. 5 is a cross-sectional view illustrating another modification example of the torque tube of the gas turbine illustrated in FIG. 1.

Here, the modification example shown in FIG. 4 may be additionally modified in order to obtain strength. FIG. 5 shows another modification example of the torque tube. The modification example shown in FIG. 5 is generally similar to that shown in FIG. 4, but differs from that shown in FIG. 4 in that a reinforcement portion 134c has a substantially uniform outer diameter as a whole.

Specifically, the reinforcement portion 134c has an outer diameter which is equal to that of the second end 133 and smaller than that of the first end 132. However, the reinforcement portion 134c has a minimum inner diameter across a partial section of a substantially central portion thereof.

In the modification example shown in FIG. 5, the reinforcement portion has a shape formed by enlarging the reinforcement portion of the torque tube shown in FIG. 3, thereby having a higher strength.

Figure 6:
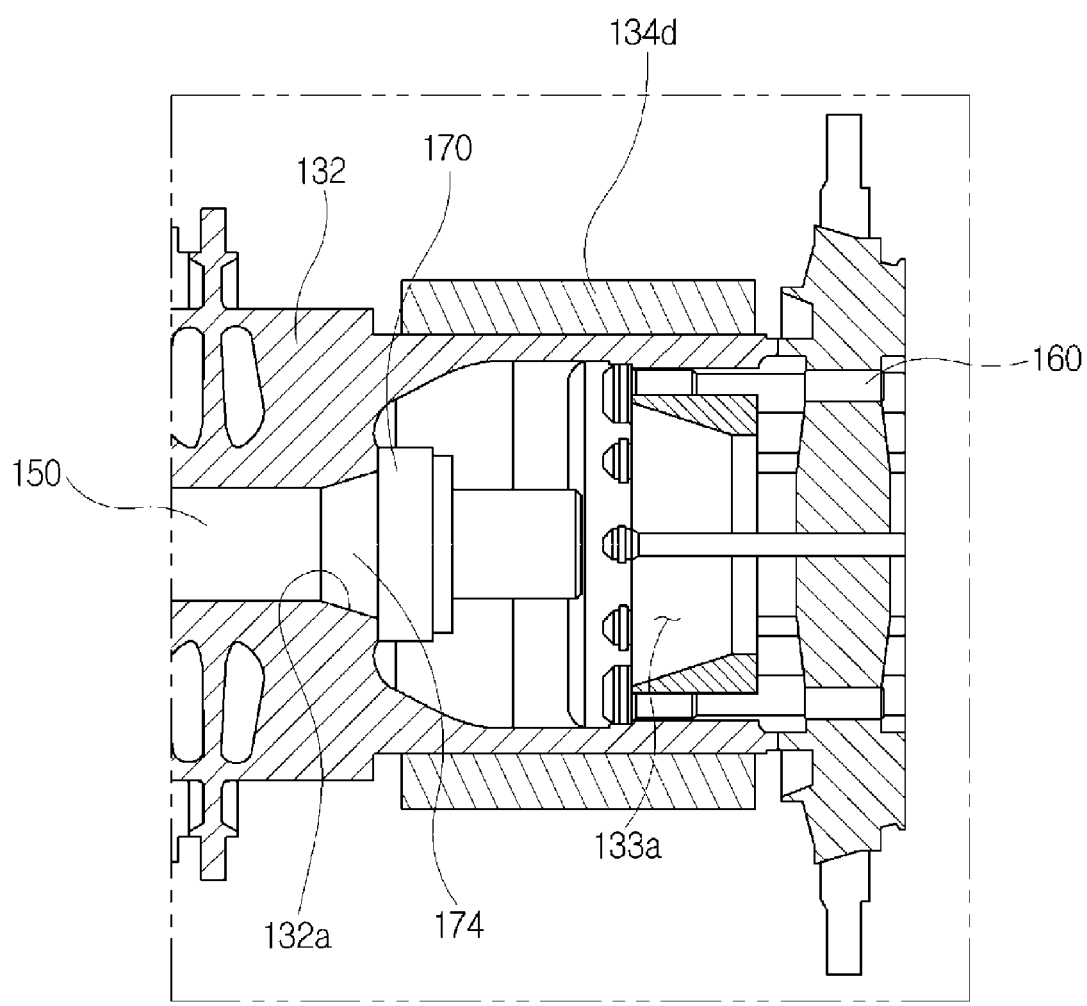
FIG. 6 is a cross-sectional view illustrating a further modification example of the torque tube of the gas turbine illustrated in FIG. 1.

FIG. 6 shows a further modification example of the torque tube. The modification example shown in FIG. 6 is generally similar to that shown in FIG. 3, but the reinforcement portion 134 is omitted and reinforcement portions 134d are formed at the outer peripheral portion of the torque tube in the modification example of FIG. 6. Each of the reinforcement portions 134d has a board shape extending in an axial direction and the reinforcement portions 134d are radially arranged along the outer peripheral portion of the torque tube.

Each of the reinforcement portions 134d extends between the first and second ends 132 and 133, and may have an arbitrarily set length if necessary. The reinforcement portion 134d prevents vertical deflection of the torque tube based on FIG. 6 and also serves to improve a torsional strength with respect to rotational torque transferred from the turbine section.

Here, since the reinforcement portions 134d are arranged to be circumferentially spaced at predetermined intervals, instead of being continuously formed on the entirety of the outer peripheral portion of the torque tube, the reinforcement portions 134d may give a sufficient strength while minimizing increase of weight.

As described above, since the compressor section and the turbine section are respectively coupled to both ends of the torque tube in the embodiment or modification examples, the compressor section may be maintained in a state of being coupled to the torque tube even though the turbine section is separated from the torque tube.

In general, deterioration is frequently generated in the turbine section exposed to high-temperature combustion gas compared to in the compressor section, and thus maintenance of the gas turbine is often performed. According to the embodiment, only the turbine section may be separated when maintenance thereof is required, thereby enabling the maintenance of the gas turbine to be easily performed.

In addition, since both are able to be modulated and treated in the production process, productivity may be increased. In addition, the capacity of the gas turbine may be easily increased by replacing the compressor section and the turbine section even when an existing gas turbine is enlarged, and thus it is possible to shorten a development period of the gas turbine.

In addition, since the rotational torque is generated by collision with combustion gas in the turbine rotor disks arranged in the turbine section, the turbine section is exposed to high stress compared to the compressor section. Thus, an optimal disk shape capable of enduring high stress may be formed only when a high degree of freedom of design is given during design of the turbine rotor disks compared to the compressor rotor disks. In the embodiment, the plurality of tie rods having small diameters on the outer peripheral portions thereof is used and a hole is not formed on the center of each disk. Thus, low hoop stress is applied to the disk compared to a case of using the center tie rod. In addition, production cost may be reduced since the tie rod is made of a cheaper material.

Now, a method of assembling the gas turbine according to the embodiment will be described with reference to FIGS. 7A to 7D. Here, a method of assembling the combustor, the diffuser, and the shroud may be performed by the conventionally known methods, and thus description thereof will be omitted and a method of assembling the tie rods and individual disks will be described.

Figure 7A:
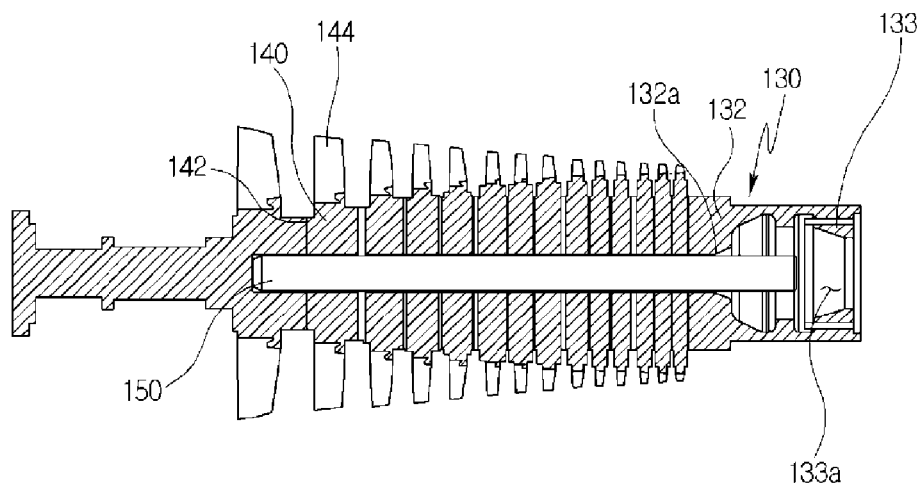
FIGS. 7A to 7D are cross-sectional views illustrating a process of assembling the gas turbine illustrated in FIG. 1.

Referring to FIG. 7A, one end of the center tie rod 150 is first coupled to the foremost compressor rotor disk. Here, although the foremost compressor rotor disk has a fastening hole for fastening of the center tie rod, an example of adding a separate pressure nut may be considered instead of the fastening hole. Subsequently, the plurality of compressor rotor disks 140 is inserted in the axial direction of the center tie rod 150. In this case, the facing surfaces of the respective compressor rotor disks 140 are coupled to the center tie rod such that the compressor rotor disks 140 are not rotated relative thereto.

When the insertion of the last compressor rotor disk 140 is completed, the torque tube 130 is mounted to the end of the center tie rod 150.

Figure 7B:
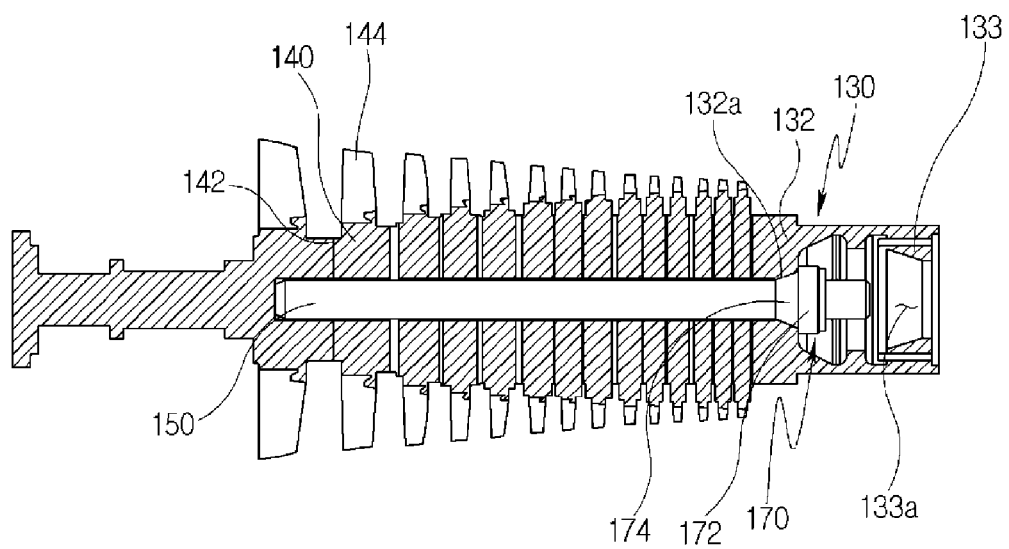

Subsequently, the first pressure nut 170 is fastened into the first through-hole 132a as shown in FIG. 7B. Through such a process, the compressor section is fully assembled. As shown in FIG. 7B, the turbine section is not yet assembled, but the individual compressor rotor disks are fixed by the first pressure nut so as not to be axially moved relative to the center tie rod.

In this case, the first pressure nut 170 is inserted through the inner space of the torque tube. Specifically, the first pressure nut 170 is inserted through the service hole 133a formed on one side end of the torque tube. Then, through such a structure, after the assembly of the compressor section is completed, the turbine section may be sequentially assembled.

After the assembly of the compressor section is completed, the plurality of tie rods 160 is inserted into the other side end of the torque tube. One ends of the tie rods 160 are fixed to the torque tube by the plurality of second pressure nuts 190 inserted through the service hole. The insertion and fastening of the second pressure nuts 190 may be performed through the service hole 133a formed at the torque tube.

Figure 7C:
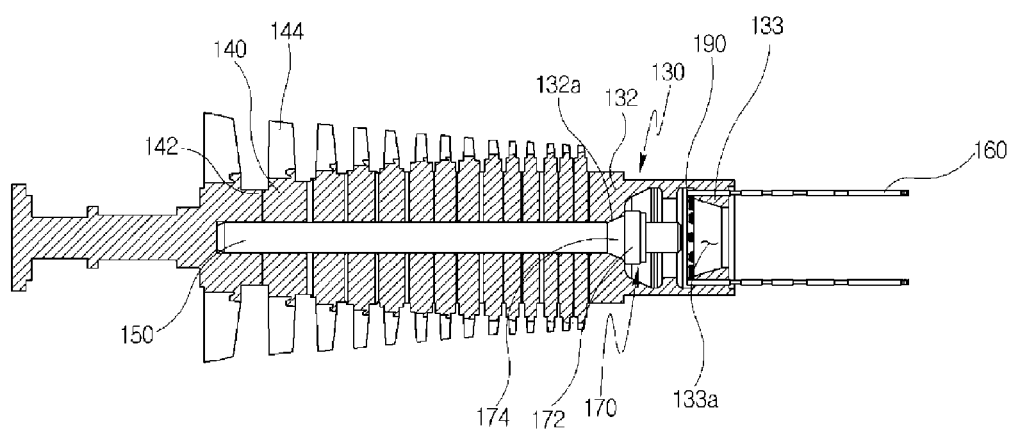
Figure 7D:
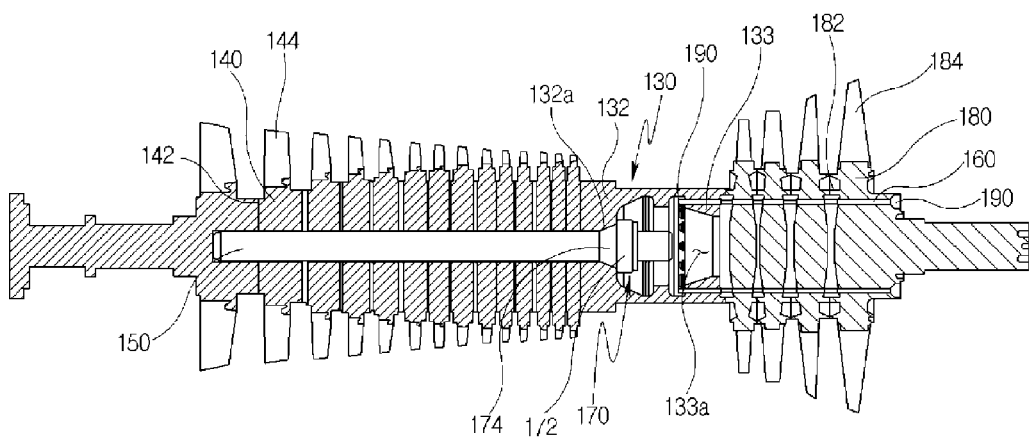

When the fastening of the second pressure nuts 190 is completed, the plurality of tie rods 160 is fixed to the torque tube as shown in FIG. 7C. In this case, since the plurality of tie rods is fixed to the torque tube, the turbine rotor disks may be easily inserted to the tie rods without a separate support such as a jig by inserting the tie rods 160 through a series of through holes 161 in the turbine rotor disks. The second pressure nuts 190 are fastened to the ends of the tie rods after the insertion of the last turbine rotor disk, and the assembly of the turbine and compressor sections is completed as shown in FIG. 7D.

Meanwhile, the assembled turbine and compressor sections may be disassembled in the reverse order of the assembly. That is, when a portion of the turbine rotor disks is damaged, the damaged turbine rotor disk should be removed and replaced with a new turbine rotor disk. To this end, the second pressure nuts 190 fastened to the ends of the tie rods are first separated therefrom.

When the second pressure nuts 190 are separated from the tie rods, each of the turbine rotor disks may be separated and the separated turbine rotor disk may be repaired and then reassembled or replaced with a new turbine rotor disk. In this case, since the compressor section is maintained in a fastened state by the first pressure nut regardless of the fastened states of the second pressure nuts, the gas turbine need not be entirely disassembled for replacement of the turbine rotor disk.

As is apparent from the above description, according to exemplary embodiments of the present invention, since separate tie rods are respectively provided in a compressor section and a turbine section, instead of one tie rod traversing a whole gas turbine, and the compressor section and the turbine section are interconnected by a torque transfer member, generation of vibration and noise can be minimized. In addition, deflection of each tie rod can be minimized even though the tie rod is used for a long time.

In addition, since a plurality of radial tie rods is arranged to the turbine section and a user is easily accessible to a first tie rod for fastening of the compressor section, maintenance of the gas turbine can be easily performed.

In addition, since the compressor section is maintained in a state of being fastened by a first tie rod and a first pressure nut even though the turbine section is separated therefrom, it is possible to save effort of disassembling a whole turbine.

While the present invention has been described with respect to the specific embodiments, it will be apparent to those skilled in the art that various changes and modifications may be made without departing from the spirit and scope of the invention as defined in the following claims.

What is claimed is:
1. A gas turbine comprising:
a compressor section having a plurality of compressor-side rotor disks;
a turbine section having a plurality of turbine-side rotor disks arranged downstream of the compressor-side rotor disks;
a first tie rod penetrating central portions of the rotor disks provided in the compressor section to press the compressor-side rotor disks against each other;
a plurality of second tie rods penetrating vicinities of edges of the rotor disks provided in the turbine section to press the turbine-side rotor disks against each other; and
a torque transfer member having first and second ends coupled to the first and second tie rods so as to transfer rotational torque generated by the turbine section to the compressor section,
wherein the torque transfer member has an integral reinforcement portion formed between the first and second ends that has a wall thickness that is greater than a wall thickness of the torque transfer member on either side of the reinforcement portion.

2. The gas turbine according to claim 1, wherein the first end of the torque transfer member faces the compressor section, and the first end has a first through-hole through which the first tie rod passes.

3. The gas turbine according to claim 2, further comprising a first pressure nut fastened to one side of the first tie rod, wherein the first pressure nut presses an inside surface of the first end toward the compressor section.

4. The gas turbine according to claim 3, wherein at least a portion of the first pressure nut is inserted into the first through-hole.

5. The gas turbine according to claim 3, wherein the second end of the torque transfer member faces the turbine section, and the second end has a plurality of second through-holes arranged radially such that the second tie rods pass through the second through-holes.

6. The gas turbine according to claim 5, further comprising a second pressure nut fastened to one side of each of the second tie rods,
wherein the second pressure nut presses an inside surface of the second end toward the turbine section.

7. The gas turbine according to claim 6, wherein the second end has a service hole communicating with the inside of the torque transfer member, and access to the first and second pressure nuts is realized through the service hole.

8. The gas turbine according to claim 5, wherein the reinforcement portion protrudes towards a center of the torque transfer member.

9. The gas turbine according to claim 8, wherein the torque transfer member has an inner diameter increased toward the reinforcement portion from the first and second ends.

10. A gas turbine comprising:
a compressor section having a plurality of compressor-side rotor disks;
a turbine section having a plurality of turbine-side rotor disks arranged downstream of the compressor-side rotor disks;
a first tie rod penetrating central portions of the rotor disks provided in the compressor section to press the compressor-side rotor disks against each other;
a plurality of second tie rods penetrating vicinities of edges of the rotor disks provided in the turbine section to press the turbine-side rotor disks against each other; and
a torque transfer member comprising a torque tube having a first end facing the compressor section and a second end facing the turbine section, the torque tube being coupled to the first and second tie rods,
wherein the wall of the torque tube has an integral reinforcement portion formed between the first and second ends that has a greater thickness than a wall thickness of the torque tube on either side of the reinforcement portion.

11. The gas turbine according to claim 10, wherein a first pressure nut fastened to the first tie rod is arranged at the first end, and second pressure nuts fastened to the second tie rods are arranged at the second end.

12. The gas turbine according to claim 11, wherein the second pressure nuts are radially arranged on the second end, and the second end has a service hole which is formed radially inwardly of the second pressure nuts and communicates with the inside of the torque tube.

13. The gas turbine according to claim 12, wherein the service hole has a diameter that increases proportionally away from the second end.

14. The gas turbine according to claim 11, wherein the reinforcement portion has a larger inner diameter than an outer diameter of the first pressure nut.

15. The gas turbine according to claim 10, wherein the torque tube has an inner diameter that gradually decreases toward the reinforcement portion from the first and second ends.

16. A method of assembling a turbine, comprising:
inserting a plurality of first rotor disks to a first tie rod in a longitudinal direction thereof;
inserting a torque tube from one side end of the first tie rod, the torque tube having a first end facing a first section of the turbine and a second end facing a second section of the turbine and having an integral reinforcement portion formed between the first and second ends that has a wall thickness that is greater than a wall thickness of the torque tube on either side of the reinforcement portion;
fixing an end of the first tie rod to the torque tube in a state in which the first rotor disks are not rotated relative to the torque tube;
fixing a plurality of second tie rods to a portion of the torque tube;
inserting a plurality of second rotor disks to the plurality of second tie rods in a longitudinal direction thereof; and
fixing an end of each of the plurality of second tie rods to one of the rotor disks in a state in which the second rotor disks are not rotated relative to the torque tube.

17. The method according to claim 16, wherein the first tie rod is inserted to penetrate central portions of the first rotor disks.

18. The method according to claim 16, wherein the second tie rods are spaced radially and outwardly from centers of the second rotor disks to penetrate the second rotor disks.

19. The method according to claim 16, wherein the first rotor disks are arranged in a compressor section.

* * * * *